United States Patent [19]

O'Farrell

[11] Patent Number: 5,189,537
[45] Date of Patent: Feb. 23, 1993

[54] INDICIA DISPLAY FOR ELECTRO-OPTIC DEVICES WHEREIN THE INDICIA COMPRISES A DIELECTRIC MATERIAL EXTENDING AT LEAST PARTIALLY INTO THE ELECTRO-OPTIC MEDIUM

[75] Inventor: Desmond J. O'Farrell, Holland, Mich.

[73] Assignee: Donnelly Corporation, Holland, Mich.

[21] Appl. No.: 647,296

[22] Filed: Jan. 28, 1991

[51] Int. Cl.⁵ .................... G02F 1/13; B60Q 1/26
[52] U.S. Cl. .................... 359/71; 359/70; 359/79; 359/254; 359/838; 362/83.1; 359/38
[58] Field of Search ............ 350/338, 339 R, 343, 350/331 R, 355, 356, 357, 344; 359/70, 71, 79, 80, 74, 839, 838, 843, 245, 267, 38, 254; 362/83.1

[56] References Cited

U.S. PATENT DOCUMENTS

| | | | |
|---|---|---|---|
| 3,612,654 | 10/1971 | Klein | 350/339 R |
| 4,097,131 | 6/1978 | Nishiyama | 350/338 |
| 4,165,157 | 8/1979 | Kobale et al. | 359/80 |
| 4,418,102 | 11/1983 | Ferrato | 350/343 X |
| 4,521,079 | 6/1985 | Leenhouts et al. | 350/339 R |
| 4,600,273 | 7/1986 | Ohno | 350/344 X |
| 4,630,904 | 12/1986 | Pastore | 359/838 |
| 4,640,583 | 2/1987 | Hoshikawa et al. | 350/343 |
| 4,669,827 | 6/1987 | Fukada et al. | 350/338 |
| 4,855,727 | 8/1989 | Tsuchiya et al. | 350/357 X |
| 4,882,565 | 11/1989 | Gallmeyer | 359/839 |
| 4,940,315 | 7/1990 | Demiryont | 359/267 |

OTHER PUBLICATIONS

Gladstone et al, "liquid crystal display device configuration" JBM, vol. 15, No. 2, Jul. 1972.

Primary Examiner—William L. Sikes
Assistant Examiner—Huy K. Mai
Attorney, Agent, or Firm—Price, Heneveld, Cooper, DeWitt & Litton

[57] ABSTRACT

An electro-optic device useful as a vehicular mirror or panel, an architectural panel, or the like includes two optically transparent substrates positioned in spaced relation to each other. An electro-optic medium having a light transmittance which is variable with the application of an electric field is captured in the space between the substrates. Indicia is applied to one of the inside surfaces of the substrates. In one aspect of the invention, a dielectric material is used for the indicia. The indicia remain visible for viewing at all times during operation of the device.

41 Claims, 1 Drawing Sheet

INDICIA DISPLAY FOR ELECTRO-OPTIC DEVICES WHEREIN THE INDICIA COMPRISES A DIELECTRIC MATERIAL EXTENDING AT LEAST PARTIALLY INTO THE ELECTRO-OPTIC MEDIUM

BACKGROUND OF THE INVENTION

This invention relates to electro-optic devices which vary the transmittance of light with the application of an electric field and, more specifically, to such devices for use with vehicles, in office environments and other purposes where the device would include indicia which are visible for viewing at all times during operation of the device.

In the specific setting of outside rearview mirrors for vehicles, the passenger side mirror will typically include the phrase, "objects are closer than they appear," as required by government regulation for non-planar (convex) mirrors. Other indicia indicating a functional feature or including a logo or trademark may also be used on an electro-optic device or mirror.

Common practice is to sand blast or etch the reflective surface of a mirror to apply desired indicia. Also, indicia can be printed on the foremost surface of a mirror. However, such current methods are generally unacceptable for an electro-optic device.

A typical assembly for an electro-optic device includes an electro-optic medium sandwiched between two transparent conductors, each of which is typically glass with a transparent conductive coating. A reflector can be applied to one of the surfaces, commonly the rear most surface of the assembly, to create a reflective device. An electric field is applied across the electro-optic medium through the transparent conductors, typically resulting in a color change in that medium from transparent to a dark shade. Such darkening of the electro-optic medium attenuates the passage of light through the assembly and reduces the light which might be reflected from any included reflective coating.

If the commonly known methods are used to apply indicia to the front surface of the assembly, two significant problems arise. First, a multiple imaging problem develops whereby the indicia is obliterated and rendered illegible by multiple images which can be reflected from second, third or fourth surfaces behind it.

The second problem occurs when the electro-optic medium is darkened by the application of an electric field. Contrast between the indicia and its background is diminished when the medium is darkened, resulting in a masking effect of the indicia.

On the other hand, if the indicia is applied by common methods, such as etching or sandblasting, to one of the other surfaces, including a reflective coating on the third or fourth surface of the assembly, in an attempt to minimize the multiple imaging problem, the second problem of masking remains when the electro-optic medium darkens.

The need was therefore apparent for a solution to the problem of providing indicia in electro-optic devices which would remain visible at all times during the operation of such devices.

SUMMARY OF THE INVENTION

Accordingly, the present invention provides an electro-optic device having an electro-optic medium with a light transmittance which is variable by the application of an electric field. The device includes a dielectric forming indicia on either a front or rear facing surface of the space which confines the electro-optic medium.

In one aspect of the invention, a reflective coating is included to form an electro-optic mirror. The reflective coating is preferably applied to the fourth surface of the device, but may be applied to the third surface. In another aspect of the invention, the dielectric quality of the indicia material minimizes the electric field in the area of the indicia, thus limiting the color change of the electro-optic medium and enhancing the visibility of the indicia. In another aspect of the invention, the thickness of the indicia is close to, but less than, the thickness of the space confining the electro-optic medium to enhance visibility of the indicia and to minimize distortion of the indicia when the device is assembled. The indicia should not be so thick as to compress, bulge or distort when the front and rear plates are assembled.

The present invention addresses the problem of multi-imaging when indicia is used on an electro-optic device by applying the indicia to the front facing surface of the space confining the electro-optic medium (i.e. the third surface) to minimize the number of potentially reflective surfaces behind the indicia as it is being viewed. The masking problem is addressed by the use of a dielectric material forming the indicia within the space confining the electro-optic medium. The dielectric quality of the material minimizes the electric field in the area of the indicia to limit the color change of the electro-optic medium in the area of the indicia and maintain contrast between the indicia and the electro-optic medium. The placement of the indicia within the space confining the electro-optic medium also minimizes and preferably eliminates the thickness of the electro-optic medium through which the indicia might otherwise be viewed, again maintaining the contrast between the indicia and the electro-optic medium.

DESCRIPTION OF THE PREFERRED EMBODIMENT

Figure 1:
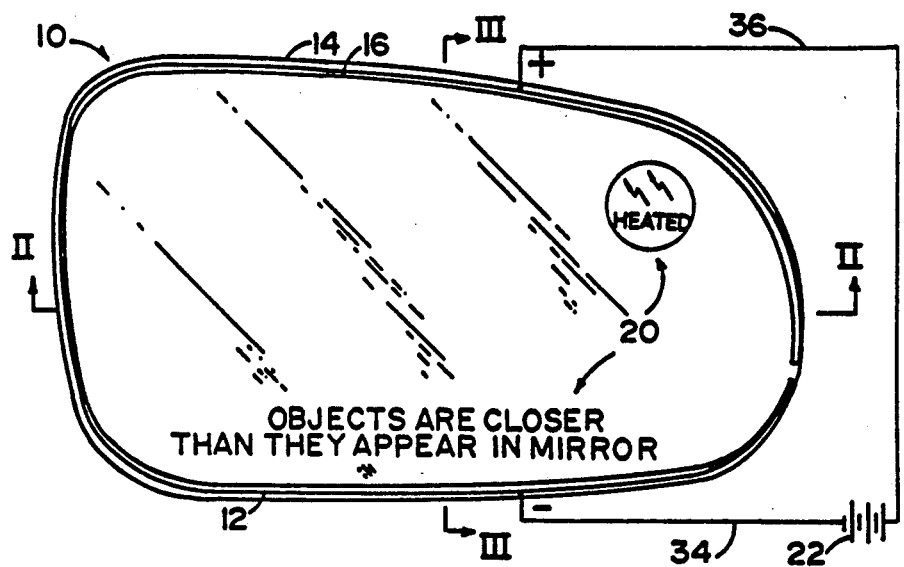
FIG. 1 is a schematic front elevation of an electro-optic mirror according to the present invention.

Referring now to the drawings in greater detail, an electro-optic device 10 according to the present invention comprises a front or first optically transparent or clear element or substrate 12, a rear or second optically transparent element or substrate 14, a perimeter seal 16, an electro-optic medium 18, indicia 20 and an electrical source 22.

Figure 2:
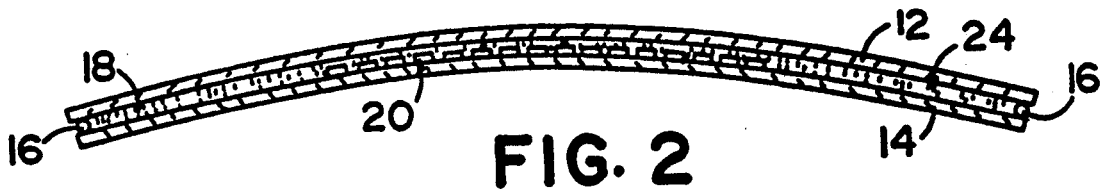
FIG. 2 is a sectional view taken along plane II—II of FIG. 1.

Each element 12 and 14 is preferably formed from a generally planar sheet of conventional soda lime window glass. Typically, each element 12 and 14 will be about two millimeters thick. Elements 12 and 14 might also be resinous, polymeric sheets of acrylic or other optically clear plastic material or a laminate glass assembly for the added safety benefit of minimizing fragment scattering and lacerative injuries if broken and/or to reduce weight as described in commonly assigned U.S. Pat. No. 5,115,346 entitled "ANTI-SCATTER, ULTRAVIOLET PROTECTED, ANTI-MISTING, ELECTRO-OPTICAL REARVIEW MIRROR," and issued on May 19, 1992 Lynam, the disclosure of which is hereby incorporated by reference herein. As shown in FIG. 2, elements 12 and 14 may be formed to non-planar shapes, such as a convex shape commonly used for an outside rearview mirror of a vehicle.

Figure 3:
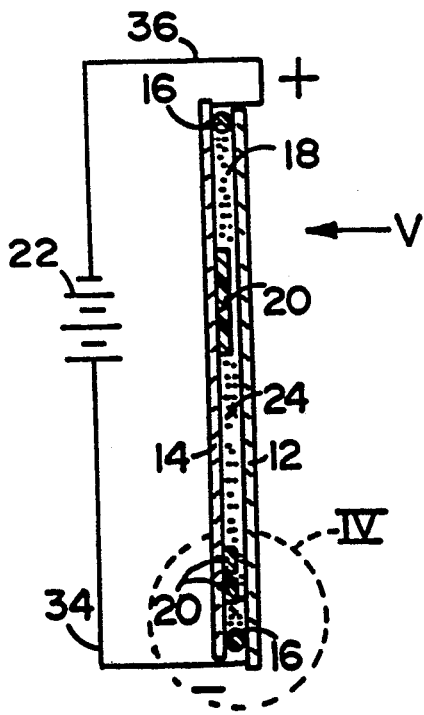
FIG. 3 is a sectional view taken along plane III—III of FIG. 1.
Figure 4:
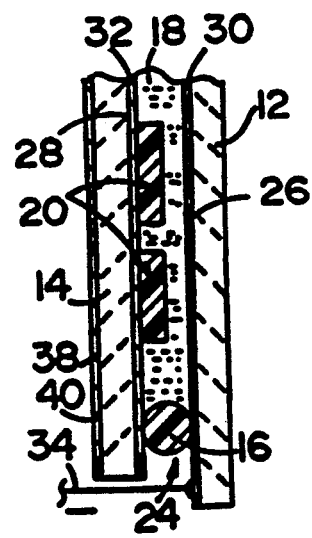
FIG. 4 is a fragmentary, enlarged detail view of area IV of FIG. 3.

Element 14 is spaced slightly rearward from element 12 to define a gap or space 24 for receiving electro-optic medium 18 (FIGS. 2, 3 and 4). Space 24 preferably has a uniform thickness defined by the generally parallel rear or inner surface 26 of front element 12 and front or inner surface 28 of rear element 14, regardless of whether the elements 12 and 14 are strictly planar or curved (FIG. 4). As discussed below, the thickness of space 24 may vary within the range of approximately 8 microns to 150 microns depending upon the electro-optic medium used.

Each of the inner surfaces 26 and 28 is coated with a transparent conductive coating 30 and 32, respectively (FIG. 4). Each conductive coating 30 and 32 is preferably an approximately 1,500 angstrom thick layer of indium tin oxide (ITO) which is substantially transparent to incident visible light yet is sufficiently electrically conductive to enable application of an electric field or voltage across space 24, between the ITO layers 30 and 32.

Electrical energy is provided from source 22 to coating 30 by wire lead 34 which is secured in conventional manner to coating 30 (FIG. 1). Similarly, electrical energy is provided from source 22 to coating 32 by wire lead 36 which is secured in conventional manner to coating 32. Alternatively, a perimeter coating method may be used in conjunction with perimeter electro contact clips and lead wires as described in commonly assigned U.S. Pat. No. 5,066,112 entitled "PERIMETER COATED, ELECTRO-OPTIC MIRROR, " and issued on Nov. 19, 1991 to Lynam and Gahan, the disclosure of which is hereby incorporated by reference herein.

In order to confine and retain electro-optic medium 18 in gap 24, perimeter seal 16 is applied adjacent the perimeter of elements 12 and 14 (FIGS. 2, 3 and 4). Seal 16 is formed from an epoxy material which adheres well to the ITO coatings 30 and 32 on inner surfaces 26 and 28. A suitable epoxy sealing material is EPON 828 TM from Shell Chemical Company of Houston, Tex., cured by polyamide based curing agents such as V40 TM from Miller Stephenson Company of Danbury, Conn. The epoxy is preferably silk-screened onto the inner surface of front element 12, rear element 14 or both elements. The corresponding glass elements are then placed face to face with the epoxy still tacky. Seal 16 is then fully cured, typically by placing the assembly into an oven at 110° C. for about three hours. Gap 24 can subsequently be filled by a variety of means such as simple injection of electro-optically active material using a syringe or by vacuum backfilling using a technique well established for manufacture of liquid crystal devices.

When electrochemichromic or electrochromic materials are used for the electro-optic medium, uniformity of the spacing of the elements 12 and 14 may be enhanced by the inclusion of small, rigid, glass beads mixed into epoxy seal 16 prior to application of the seal 16. Suitable glass beads for such use are available under the trademark GS/150 from Nippon Electric Glass of Des Plaines, Ill. Such glass beads may typically have a diameter of 150 microns and so appropriately space the elements 12 and 14 about 150 microns apart.

Electro-optic device 10 may also include perimeter coatings and seals as described in U.S. Pat. No. 5,066,112, referenced above and as disclosed in copending, commonly assigned U.S. patent application Ser. No. 07/618,169, filed Nov. 26, 1990, entitled "VEHICULAR OUTSIDE MIRROR ASSEMBLY," invented by Desmond J. O'Farrell, the disclosure of which is hereby incorporated by reference herein.

Indicia 20 may be applied at any time prior to assembling elements 12 and 14 together. Indicia 20 is conveniently silk-screened onto one of the inner surfaces 26 and 28 at the time seal 16 is applied. Preferably, indicia 20 is applied to front surface 28 of rear element 14 to minimize potential multiple imaging problems. Further, the thickness of the applied indicia 20 is preferably less than, but close to, the width of gap 24 so that the indicia 20 is not physically distorted when elements 12 and 14 are mated as discussed above. The thickness of indicia 20 may in fact be the same as the width of space 24, provided that the indicia 20 is not physically distorted during assembly.

A dielectric material is used for indicia 20 to minimize the electric field generated between ITO coatings 30 and 32 in the area of indicia 20 when an electric current is applied to device 10. A preferred dielectic material for indicia 20 is the epoxy material commonly available as EPON 828 TM from Shell Chemical Company of Houston, Tex., cured by polymide based curing agents such as V40 TM from Miller Stevenson Company of Danbury, Conn., as discussed above. By so minimizing the electric field, the color change in the electro-optic medium 18 is also minimized in the area of indicia 20 to better maintain the contrast between the indicia 20 and its background, thus maintaining the visibility of the indicia 20 during all phases of operation of the device.

Various types of electro-optic media may be inserted in gap 24. For example, a suitable liquid crystal material in which molecules are oriented to block the passage of light therethrough when an electric field is applied is a guest host die such as D5 TM produced by BDH Co. of Dorset, England, dissolved in n-type nematic liquid crystal such as N(P-Methoxybenzilidene)-P'-Butylaniline. For such material, gap 24 is typically eight to twelve microns wide. For electrochemichromic devices, the gap can contain a liquid, thickened liquid, gel or semisolid material such as formulations described in U.S. Pat. No. 3,506,229 to Schoot, or as described in commonly assigned U.S. Pat. No. 5,140,455, entitled "HIGH PERFORMANCE ELECTROCHEMICHROMIC SOLUTIONS AND DEVICES THEREOF," and issued on Aug. 18, 1992 to Varaprasad, et al.; commonly assigned U.S. Pat. No. 5,142,407, entitled "METHOD OF REDUCING LEAKAGE CURRENT IN ELECTROCHEMICHROMIC SOLUTIONS AND SOLUTIONS BASED THEREON," Aug. 25, 1992 to Varaprasad, et al.; and copending, commonly assigned U.S. patent application Ser. No. 07/458,969, filed Dec. 29, 1989, entitled "METHOD FOR REDUCING CURRENT LEAKAGE AND ENHANCING UV STABILITY IN ELECTROCHEMICHROMIC SOLUTIONS AND DEVICES," invented by Desaraju V. Varaprasad, et al., the disclosures of which are hereby incorporated by reference herein. In electrochromic devices, a material such as poly-AMPS TM available from Lubrizol Corp. of Wickliffe, Ohio, may be used. Also, a liquid, thickened liquid, gel or semisolid material can be used as is conventionally known. Gap or space 24 is typically 50 to 150 microns wide in these electrochromic or electrochemichromic devices. With the latter materials, application of an electric field will cause the media 18 to color to successively darker colors or shades as larger voltages are applied. When voltage is turned off or reversed, the coloring is bleached allowing full transmittance of light.

In an alternative embodiment, electro-optic device 10 may be a mirror assembly including a reflective layer 38 coated on the rear surface 40 of rear element 14 (FIG. 4). Reflective layer 38 is preferably a metallic material such as aluminum, or a combination of silver and copper as is conventionally known. Such layer provides a highly specular surface which reflects approximately 80% to 90% of the light incident thereon through front and rear elements 12 and 14 and electro-optic medium 18 in space 24. Reflective layer 38 has a thickness within the range of about 500 and 1,000 angstroms. Other materials which may be used for the reflective layer include chromium, stainless steel, rodium, platinum, polatium and/or combinations thereof as disclosed in U.S. Pat. No. 5,066,112, referenced above.

Regardless of the form in which the electro-optic device 10 of the present invention is usefully incorporated, whether it is a rearview mirror for a vehicle, a roofing panel in a car or building, or a window panel in a building wall or office partition panel, for example, the operation of the device is basically similar. The electro-optic device 10 is typically viewed predominently from one side, as indicated by arrow V (FIG. 3). Indicia 20 is preferably applied to the third surface of the device 10, surface 28 within space 24. Such placement of the indicia 20 eliminates surface 26, the second surface of the device, as a potential refractive surface for the image of indicia 20 to reflect from. Also, the location of indicia 20 on surface 28 locates the indicia as close as possible to the fourth surface of device 10, the rear surface 40 of rear element 14, so that any parallactic reflection of the image of indicia 20 from surface 40 is minimized. When an electric field is not applied to electro-optic medium 18, it is readily apparent that indicia located within gap 24 is visible to anyone viewing device 10. When an electric current is supplied from source 22, through leads 34 and 36 to coatings 30 and 32, respectively, electro-optic medium 18 darkens. However, since indicia 20 is formed of a dielectric material, any electric field generated by the above described supply of electric current is minimized in the vicinity of indicia 20 and the darkening of medium 18 is also minimized. Thus, indicia 20 remains visible. Further, visibility of indicia 20 is enhanced by preferably coloring indicia 20 to contrast with the color attained by electro-optic medium 18 when an electric field is applied. Such coloration is described in U.S. Pat. No. 5,066,112, referenced above. As disclosed therein, a suitable nonconductive coloring agent, such as granulated carbon black, for example, may be added to the above described epoxy indicia material.

It is known that several electro-optic mirror devices developed in recent years have generally poor ultraviolet radiation stability. When exposed to prolonged ultraviolet radiation from sunlight, such electro-optic devices can suffer substantial degradation of their electro-optic medium resulting in poor electrical coloration responsiveness including increased response time and failure to properly bleach when electric voltage is switched off. Permanent discoloration of the medium may also occur. This can cause substantial vision problems.

Further, it can be shown that a substantial portion of solar ultraviolet radiation is unattenuated by soda lime glass front element 12. The present invention recognizes that use of ultraviolet radiation absorbing, blocking or screening materials, incorporable in the electro-optic medium itself or in additional layers to the electro-optic device 10, will reduce ultraviolet radiation impinging on the electro-optic medium and significantly prolong its lifetime as described in U.S. Pat. No. 5,115,346, referenced above.

It is also recognized that substantial reduction in the amount of ultraviolet radiation transmitted into the electro-optic medium of the assembly may be accomplished by using specialized glasses, paints or lacquers. Thus, as discussed in U.S. Pat. No. 5,115,346, referenced above, a specialized UV absorbing glass, such as a blue tint glass, can be used for either or both glass substrates, 12, 14 and, thereby, greatly reduce the UV radiation impinging on the electro-optic medium 18 by transmission through element 12 or by re-transmission through rear element 14 in the event that a reflective element 38 is present. It is further recognized that laminate layers, coatings or films can simultaneously and synergistically protect a user against potential laceration or injury from scattering or breaking glass fragments should the assembly be accidentally struck as discussed in U.S. Pat. No. 5,115,346, referenced above.

While alternative embodiments of the invention have been shown and described, other forms will now be apparent to one skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. An electro-optic device comprising:
    a pair of optically transparent substrates positioned in spaced relation to one another, each substrate having an inner surface facing the inner surface of the other substrate, an opposing outer surface and a perimeter edge, said inner surfaces defining a space between said substrates;
    an electro-optic medium confined in said space and having a light transmittance which is variable by the application of an electric field;
    a seal extending between said substrates near their respective perimeter edges, circumscribing said space between said substrates, and confining said electro-optic medium in said space;
    electrical means for applying an electric field to said electro-optic medium; and
    a dielectric material forming indicia on at least one of said inner surfaces, said indicia extending from said one surface toward the other of said surfaces and extending at least partially into said electro-optic medium.

2. The device of claim 1 wherein said indicia have thickness, said space has width and said thickness is not greater than said width.

3. The device of claim 2 wherein said indicia are a layer of epoxy material.

4. The device of claim 3 wherein said epoxy material of said indicia includes a substantially nonconductive coloring agent for enhancing the visibility of said indicia.

5. The device of claim 1 wherein said electrical means includes an optically transparent, electrically conductive layer on each of said inner surfaces.

6. The device of claim 5 wherein said electrical means further includes an electrical lead connected to each of said conductive layers.

7. The device of claim 5 wherein said seal is formed of a dielectric material.

8. The device of claim 7 wherein said seal is a layer of epoxy material.

9. The device of claim 7 wherein said seal is a layer of epoxy material incorporating a plurality of small glass beads mixed therein.

10. The device of claim 7 wherein said electro-optic medium is a liquid crystal material in which molecules are oriented to block the passage of light therethrough when an electric field is applied thereto.

11. The device of claim 7 wherein said electro-optic medium is one of an electrochemichromic material and an electrochromic material.

12. The device of claim 7 wherein said device further includes a reflective coating on one of said inner and outer surfaces of one of said substrates, said coating being adapted to reflect light incident thereon through said electro-optic medium and said other substrate.

13. The device of claim 12 wherein said indicia are located on said inner surface of said substrate which has said reflective coating thereon.

14. The device of claim 13 wherein said reflective coating is on said outer surface.

15. An electro-optic device comprising:
a first optically transparent substrate having a front surface, an opposing rear surface and a perimeter edge;
a second optically transparent substrate having a front surface, an opposing rear surface and a perimeter edge, said second substrate being positioned in spaced relation to said first substrate to define a space having thickness between said rear surface of said first substrate and said front surface of said second substrate;
an electro-optic medium confined in said space and having a light transmittance which is variable by the application of an electric field;
a seal circumscribing said space and extending between said first and second substrates near their respective perimeter edges for spacing said substrates apart and confining said electro-optic medium in said space;
electrical means for applying an electric field to said electro-optic medium;
a reflective coating on one of said front surface and rear surface of said second substrate and adapted to reflect light incident thereon through said electro-optic medium and said first substrate; and
a dielectric material indicia on one of said rear surfaces of said first substrate and said front surface of said second substrate, said indicia extending from said one surface toward the other of said surfaces and extending at least partially into said electro-optic medium.

16. The device of claim 15 wherein said indicia has a thickness which is not greater than said space thickness.

17. The device of claim 16 wherein said indicia are located on said front surface of said second substrate.

18. The device of claim 17 wherein said indicia are a layer of epoxy material.

19. The device of claim 18 wherein said epoxy material of said indicia includes a substantially nonconductive coloring agent for enhancing the visibility of said indicia.

20. The device of claim 16 wherein said electrical means includes an optically transparent, electrically conductive layer on each of said rear surface of said first substrate and said front surface of said second substrate.

21. The device of claim 20 wherein said electrical means further includes an electrical lead connected to each of said conductive layers.

22. The device of claim 20 wherein said seal is formed of a dielectric material

23. The device of claim 22 wherein said seal is a layer of epoxy material.

24. The device of claim 22 wherein said seal is a layer of epoxy material incorporating a plurality of small glass beads mixed therein.

25. The device of claim 22 wherein said electro-optic medium is a liquid crystal material in which molecules are oriented to block the passage of light therethrough when an electric field is applied thereto.

26. The device of claim 22 wherein said electro-optic medium is one of an electrochemichromic material and an electrochromic material.

27. The device of claim 22 wherein said reflective coating is on said rear surface of said second substrate.

28. The device of claim 27 wherein said reflective coating is a layer of one of aluminum, a combination of silver and copper, chromium, stainless steel, rhodium, platinum and palladium.

29. An electro-optic device comprising:
at least a pair of optically transparent substrates positioned in generally parallel spaced relation to one another, each of said substrates having an inner surface facing the inner surface of the other substrate, an opposing outer surface and a perimeter edge, said inner surfaces defining a space having thickness between said substrates;
an electro-optic medium confined in said space and having a light transmittance which is variable by the application of an electric field;
a seal circumscribing said space and extending between said substrates near their respective perimeter edges for spacing said substrates apart and confining said electro-optic medium in said space;
electrical means including an optically transparent, electrically conductive layer on each of said inner surfaces for applying an electric field to said electro-optic medium;
a reflective coating on one of said inner and outer surfaces of one of said substrates and adapted to reflect light incident thereon through said electro-optic medium and said other substrate; and
a dielectric material forming indicia on one of said inner surfaces, said indicia extending from said one surface toward the other of said surfaces and extending at least partially into said electro-optic medium.

30. The device of claim 29 wherein said indicia has a thickness which is not greater than said space thickness.

31. The device of claim 30 wherein said indicia are located on said inner surface of said substrate which has said reflective coating thereon.

32. The device of claim 31 wherein said indicia are a layer of epoxy material.

33. The device of claim 32 wherein said epoxy material of said indicia includes a substantially nonconductive coloring agent for enhancing the visibility of said indicia.

34. The device of claim 29 wherein said electrical means further includes an electrical lead connected to each of the conductive layers.

35. The device of claim 29 wherein said seal is formed of a dielectric material.

36. The device of claim 35 wherein said seal is a layer of epoxy material.

37. The device of claim 35 wherein said seal is a layer of epoxy material incorporating a plurality of small glass beads mixed therein.

38. The device of claim 35 wherein said electro-optic medium is a liquid crystal material in which molecules are oriented to block the passage of light therethrough when an electric field is applied thereto.

39. The device of claim 35 wherein said electro-optic medium is one of an electrochemichromic material and an electrochromic material.

40. The device of claim 35 wherein said reflective coating is on said outer surface.

41. The device of claim 40 wherein said reflective coating is a layer of one of aluminum, a combination of silver and cooper, chromium, stainless steel, rhodium, platinum and palladium.

* * * * *

UNITED STATES PATENT AND TRADEMARK OFFICE
CERTIFICATE OF CORRECTION

PATENT NO. : 5,189,537
DATED : February 23, 1993
INVENTOR(S) : Desmond J. O'Farrell It is certified that error appears in the above-identified patent and that said Letters Patent is hereby corrected as shown below:

Column 4, line 28;

"polymide" should read --polyamide--

Column 5, line 21;

"rodium" should be --rhodium--.

Column 5, line 22;

"polatium" should be --palladium--.

In the Claims:

Column 7, line 59;

after "material" insert --forming--.

Column 10, line 12;

UNITED STATES PATENT AND TRADEMARK OFFICE
CERTIFICATE OF CORRECTION

PATENT NO. : 5,189,537
DATED : February 23, 1993
INVENTOR(S) : Desmond J. O'Farrell It is certified that error appears in the above-indentified patent and that said Letters Patent is hereby corrected as shown below:

Col. 10, line 12, "cooper" should read --copper--

Signed and Sealed this

Twelfth Day of April, 1994

Attest:

BRUCE LEHMAN

Attesting Officer

Commissioner of Patents and Trademarks